3,013,032
PROCESS FOR PREPARING α-HALOGENATION OF Δ⁴-3-KETO STEROIDS
Alan H. Nathan, Kalamazoo Township, Kalamazoo County, Mich., assignor to The Upjohn Company, Kalamazoo, Mich., a corporation of Michigan
No Drawing. Filed Oct. 24, 1958, Ser. No. 769,293
11 Claims. (Cl. 260—397.45)

This invention relates to a novel process for the halogenation of steroids, more particularly to the 2-halogenation of a Δ⁴-3-keto steroid containing an isolated double bond without thereby halogenating the double bonds.

According to this invention, a Δ⁴-3-keto steroid containing at least one isolated double bond and having a radical attached by a carbonyl group at the 2-position of the steroid nucleus is reacted with an N-haloamide or N-haloimide under essentially anhydrous, non-acidic conditions to produce a 2-halo-Δ⁴-3-keto steroid containing the starting isolated double bond and a radical attached by a carbonyl group at the 2-position of the steroid nucleus.

In its broader aspects, this invention realtes to the halogenation of a Δ⁴-3-keto steroid containing at least one isolated double bond without thereby halogenating the isolated double bond by (1) condensing a Δ⁴-3-keto steroid containing at least one isolated double bond and two hydrogen atoms attached to the C₂ carbon atom with a lower-alkyl ester of formic, oxalic or trifluoroacetic acid in the presence of an alkali-metal base condensing agent, to produce a 2-R-Δ⁴-3-keto steroid wherein R is formyl, trifluoroacetyl or alkoxyoxalyl; (2) halogenating the thus-produced steroid under essentially anhydrous, non-acidic conditions with an N-haloamide or N-haloimide as more fully defined herein to produce a 2-halo-2-R-Δ⁴-3-keto steroid wherein R has the value given above; and (3) removing the 2-carbonyl radical with an alkali-metal base and a lower-alkanol to produce a 2-halo-Δ⁴-3-keto steroid containing the starting isolated double bond.

The alpha halogenation of Δ⁴-3-keto steroids with halogen is known in the art. See, for example, U.S. 2,736,734. Moreover, the alpha halogenation of Δ⁴-3-keto steroid having a radical attached by a carbonyl group at the 2-position with halogen is known in the art. See, for example, U.S. 2,730,537 and 2,790,814. However, these processes are not adaptable to Δ⁴-3-keto steroids containing an isolated double bond as the halogenation of the double bond is a competitive reaction which markedly reduces the yield of desired product, as well as producing a complex reaction mixture. N-haloamides and N-haloimides have been employed to halogenate Δ⁴-3-keto steroids without an α-carbonyl group or an isolated double bond to produce a 6-halo steroid [Meystre and Wettstein, Experientia, 2, 408 (1946); Sondheimer et al., J. Am. Chem. Soc., 75, 5932 (1953); Mattox et al., J. Biol. Chem., 197, 261 (1952)] and, in the presence of base, to produce a 4-halo-Δ⁴-unsaturated-3-keto steroid [Kirk, Patel and Petrow, J. Chem. Soc., 627 (1956)]. None of these reactions produce a 2-halo-Δ⁴-3-keto steroid containing an isolated double bond.

In contrast to the prior art, it is now possible, according to the present invention, to alpha halogenate a Δ⁴-3-keto steroid containing an isolated double bond without affecting the isolated double bond, producing a 2-halo-Δ⁴-3-keto steroid in high yield. When following the comparable reaction employing chlorine, bromine or iodine, the yield of desired product is markedly less.

Starting steroids for this invention, in its broader aspects, are Δ⁴-3-keto steroids with two hydrogen atoms attached to the C₂ carbon atom, i.e., the carbon atom in the two-position, and containing at least one isolated double bond, i.e., a double bond not conjugated with a carbonyl group. Included within this definition are steroids of the androstane series, which term includes the etiocholanes and the corresponding compounds without the 19-methyl group (i.e., estranes), the pregnane, series, including the allopregnanes and the corresponding 19-normethyl steroids, the bisnorcholane series, including the disnorallocholanes, i.e., those with a 17-isopropyl side chain, the norcholane series, including the norallocholanes, i.e., those with a 17-(α-ethyl)-ethyl side chain, the cholane series, including the allocholanes, i.e., those with the 17(α-n-propyl)-ethyl side chain, the coprostane series, including the cholestanes, i.e., those with the 17-[α-(δ-methyl)-n-amyl]-ethyl side chain, the ergostane series, both normal and allo, i.e., those with the 17-[α-(γ,δ-dimethyl)-n-amyl]-ethyl side chain, and the sitostane series, both allo and normal, i.e., those with the 17-[α-(γ-ethyl-δ-methyl)-n-amyl]-ethyl side chain. The isolated double bond, for example, can be at the 7(8), 8(9), 8(14), 9(11), 11(12), 14(15), 15(16), 16(17), 17(20), 20(21), or elsewhere in the side chain, when the structure of the starting steroid permits, or there can be a plurality of these isolated double bonds in the molecule.

The starting steroid, in addition to the isolated double bond and the Δ⁴-3-keto group, advantageously contains other functional groups in the molecule, e.g., halogen, including fluorine, hydroxy, lower-acyloxy, epoxide, keto, lower-alkyl, lower-alkyl ether, maleic anhydride adduct, α-unsaturated nitrile, ketal, carbo-lower-alkoxy, etc., e.g., at positions 1, 6, 7, 8, 9, 11, 12, 14, 15, 16, 17, 20, 21, and in the 20-alkyl side chain, when present. Particularly desirable are those compounds having an oxygen function at at least one of positions 11, 16, 17, 20 and 21, e.g., 11α or 11β-hydroxy, 16α or 16β-hydroxy, 17α-hydroxy, 17-keto, 20-keto, 21-hydroxy, 21-lower-acyloxy. A methyl group can advantageously be present at at least one of positions 6, 7, 16 and 17. A fluorine atom can advantageously be present at at least one of the 6, 9, 16 or 21 positions. The angular methyl group at the 10-position may be present or absent. Some of these optional additional groups are somewhat reactive toward the reagents employed in the process of this invention. Therefore, the final product will, to the extent of this reactivity, be altered from the structure of the starting steroid, as is apparent to those skilled in the art. However, this fact does not affect the operability of the process, i.e., the α-halogenation of the Δ⁴-3-keto group.

Especially useful as starting compounds are those represented by the formula:

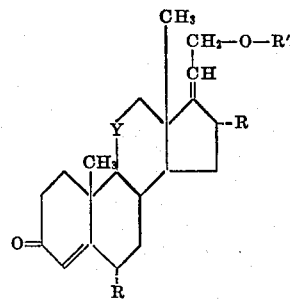

wherein R is hydrogen or methyl, at least one R being hydrogen, and R' is hydrogen or the acyl radical of a hydrocarbon carboxylic acid, e.g., containing from one to twelve carbon atoms, inclusive and Y is methylene, hydroxymethylene or carbonyl. The compound where the R in the 6-position is hydrogen and the R in the 16 position is methyl is prepared according to the method of U.S. Patents 2,790,814 and 2,781,343, but starting with the known 16-methylprogesterone, after introducing an 11-keto group, e.g., with *Cunninghamella blakesleeana* or with *Rhizopus nigricans* followed by an oxidation with chromic acid. The compounds where Y is carbonyl are prepared by the oxidation with chromic acid of the corresponding 11-hydroxy compounds when R' is acyl.

The process of the present invention produces known and useful 2-halo-Δ⁴-3-keto steroids. Many of these compounds, particularly in the androstane and pregnane series, possess pharmacological activity, e.g., adrenocortical hormone-like, androgenic and progestational activity. Others are useful as intermediates in the production of other physiologically active steroids, e.g., by altering or removing the 17-side chain or introducing activating functional groups in the molecule, e.g., the dihydroxyacetone side chain, or by dehydrohalogenating the thus produced 2-halo steroid to produce a Δ¹,⁴-3-keto steroid, which latter class of steroids are known to include an outstandingly high number of physiologically active members, e.g., prednisolone and prednisone.

CONDENSATION

The preparation of a Δ⁴-3-keto steroid having a radical attached by a carbonyl group at the 2-position can be accomplished according to techniques known in the art. See, for example, U.S. 2,790,814, 2,730,537, 2,767,198, and the application of Nathan and Hogg No. 476,059 for related condensations. The starting Δ⁴-3-keto steroid is mixed with at least 1 M. equivalent each of an alkyl ester, e.g., lower-alkyl, methyl, ethyl, octyl ester, of oxalic (i.e., the diester), formic or trifluoroacetic acid and an alkali-metal base condensing agent to produce an alkali-metal enolate of a Δ⁴-3-keto steroid having a radical attached by a carbonyl group at the 2-position e.g., wherein the carbonyl group is alkoxyoxalyl, formyl or trifluoroacetyl i.e., compounds having in the A ring the grouping—

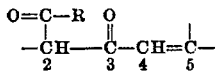

wherein R is hydrogen, trifluoroacetyl or carbo-loweralkoxy. Other radicals include those wherein R is phenyl, tolyl, acetyl, etc. The reaction is preferably performed in a non-reactive organic solvent, e.g., benzene, toluene, tertiary butyl alcohol, tetrahydrofuran, ether, hexane hydrocarbons, methanol, ethanol, or mixtures of these, with tertiary butyl alcohol being preferred.

The reaction can be conducted at the temperature ranges normally employed for condensation reactions of this general character, e.g., 0° C. to the boiling point of the reaction mixture, but a temperature somewhat above room temperature is preferred, e.g., between about 40° and 80° C. The time required to obtain substantially complete reaction may vary between less than an hour to several days, depending, in part, upon the selected solvent, the reactants, the reaction temperature and the molar proportion of reactants employed. Usually the reaction is essentially complete in about four hours or less when the reactants and reaction conditions described in the examples are employed.

Alkali-metal base condensation agents which may be used include the alkali-metal alkoxides, e.g., sodium methoxide, sodium ethoxide, potassium tertiary butoxide, lithium methoxide, the alkali-metals, e.g., finely dispersed sodium, the alkali-metal hydrides, e.g., sodium amide, the alkyl alkali-metals, e.g., triphenylmethylsodium. The alkali-metal alkoxides, and particularly potassium tertiary butoxide, are preferred.

The Δ⁴-3-keto steroid having a radical attached by a carbonyl group at the 2-position thus produced can be isolated by filtration, if precipitated, or by precipitation by drowning the reaction mixture with ether or petroleum ether. However, it usually is not desirable to isolate or purify the thus produced product as the over-all yield of 2-halogenated Δ⁴-3-keto steroid is not ordinarily improved and often is reduced by so doing. If isolation is desired, a preferred method involves filtering the alkali-metal enolate, and either using it as such or subsequently neutralizing the filter cake with acetic acid and pouring into ice and water, filtering, washing and drying the thus-obtained free enol.

HALOGENATION

According to this invention a Δ⁴-3-keto steroid having a radical attached by a carbonyl group at the 2-position, e.g., as produced in the condensation step also described hereinabove, is reacted, under non-acidic, anhydrous conditions, with an N-haloamide or N-haloimide wherein the halogen has an atomic weight from 35 to 127, inclusive, i.e., chlorine, bromine or iodine, to produce a 2-halo-Δ⁴-3-keto steroid still having a radical attached by a carbonyl group at the 2-position. Examples of these halogen containing compounds are, N-bromoacetamide, N-chloroacetamide, N-bromohydantoin, 1,3-dibromo-5,5-dimethylhydantoin, 1,3-dichloro-5,5-dimethylhydantoin, N-chlorosuccinimide, N-bromosuccinimide, N-iodosuccinimide and N-bromophthalimide. Ordinarily, about 1 M. equivalent of the N-haloamide or N-haloimide is employed per mole of steroid. However, if the steroid molecule contains other activated methylene groups, these will competitively react with the halogenating agent and an appropriately increased amount of halogenating agent must be employed, as is obvious to one skilled in the art.

The halogenation is conducted under essentially non-acidic, anhydrous conditions. Under these conditions, no free halogen is produced in the reaction mixture, thus preventing halogenation of the isolated double bond. Non-acidic conditions are conveniently met by employing an alkali-metal enolate of the starting carbonyl steroid. An alternative involves the use of the free enol plus from a trace to a molar equivalent or more of anhydrous sodium or potassium acetate or other alkali-metal salt of an aliphatic or aromatic acid. Other bases which may be employed include amines, e.g., pyridine, hydroxides, etc., but an alkali-metal salt of a hydrocarbon lower-aliphatic acid is preferred.

Non-acidic solvents commonly employed for halogenations may be used in the halogenation steps, e.g., hydrocarbons, halogenated hydrocarbons, the alkanols, etc. However, when a Δ⁴-3-keto steroid having a radical attached by a carbonyl group to the 2-position is prepared as described above and used without isolation, the reaction solvent is preferably the solvent employed in the preparation of the carbonyl compound. Tertiary butyl alcohol is a solvent well suited for these reactions and is the solvent of choice.

The halogenation is essentially instantaneous and reaction times of less than one hour are satisfactory. The reaction is preferably conducted at or below room temperature, e.g., from about −30° to about 30° C. About 0 to −5° C. is preferred.

The thus-produced 2-halo-Δ⁴-3-keto steroid having a radical attached by a carbonyl group at the 2-position can be isolated in the usual manner, e.g., by precipitation and crystallization or chromatography. However, this compound is unstable, the carbonyl-containing group being readily removed. This being the desired course of the reaction, the preferred procedure involves the in situ reaction of the thus-produced halogenated product with reagents capable of removing the carbonyl radical at the 2-position, as described hereinafter.

REVERSAL

When a 2-halo-$\Delta^4$-3-keto steroid having a radical attached by a carbonyl group at the 2-position is reacted with an alkali-metal base and an alkanol or water, the carbonyl radical at the 2-position is removed, thus producing a 2-halo-$\Delta^4$-3-keto steroid. This reversal reaction is a recognized phenomenon. See "Organic Reactions," vol. I, 269 (1942), John Wiley and Sons, Publishers. When the 2-halo-$\Delta^4$-3-keto steroid having a radical attached by a carbonyl group at the 2-position is not isolated from the reaction mixture in which it was formed, the reversal reaction is conveniently accomplished by the addition of a large volume of a lower-alkanol, e.g., methanol or ethanol, and the selected base at about $-30°$ to $30°$ C. Of the bases, the alkali-metal alkoxides are preferred with sodium methoxide and sodium ethoxide being the bases of choice. Others include sodium hydroxide and potassium hydroxide. Theoretically, about a molar equivalent of base and water or an alkanol should be employed. However, better results are obtained if a large molar excess of water or an alkanol, preferably the latter, and at least a slight molar excess of the base is employed. After a few minutes, e.g., usually less than an hour when sodium ethoxide or sodium methoxide and ethanol or methanol are employed, the reaction ordinarily is substantially complete, even at a reaction temperature of $0°$ C.

Isolation of the reaction product, as in the previous steps may be carried out by evaporation of the reaction solvent or, if water-miscible, drowning with water and filtering the precipitated steroid, followed by fractional crystallization or chromatography according to techniques well-known in the art.

The following examples are illustrative of the products and processes of this invention, but are not to be construed as limiting.

EXAMPLE 1

*2-chloro-11β,21-dihydroxy-4,17(20)-[cis]-pregnadien-3-one*

2-ETHOXYOXALYL-11β,21 - DIHYDROXY - 4,17(20)-[CIS]-PREGNADIEN-3-ONE 21-ACETATE SODIUM ENOLATE

To a stirred solution of 7.45 g. of 11β,21-dihydroxy-4,17(20)-[cis]-pregnadien-3-one 21-acetate [Hogg et al., J. Am. Chem. Soc., 77, 4436 (1955)] in 100 ml. of tertiary butyl alcohol at $65°$ C. was added, under a nitrogen atmosphere, 5.45 ml. of ethyl oxalate followed immediately by 6.57 ml. of methanol containing 1.62 g. of sodium methoxide. The mixture was stirred for 0.5 hour and then cooled, diluted with 100 ml. of ether and filtered. There was obtained 10.6 g. of 2-ethoxyoxalyl-11β,21 - dihydroxy - 4,17(20) [cis]-pregnadien-3-one 21-acetate sodium enolate.

2-CHLORO-2-ETHOXYOXALYL-11β,21-DIHYDROXY-4,17(20)-[CIS]-PREGNADIEN-3-ONE 21-ACETATE

The 10.6 g. of 2-ethoxyoxalyl-11β,21-dihydroxy-4, 17(20)-[cis]-pregnadien-3-one 21-acetate sodium enolate thus obtained was dissolved in 150 ml. of methanol and the solution was cooled to $-5°$ C. To the stirred solution was slowly added a solution of 2.0 g. of 1,3-dichloro-5,5-dimethylhydantoin in 50 ml. of methanol, keeping the reaction temperature below $0°$ C. After the addition was complete, the reaction mixture was stirred at the same temperature for 0.5 hour. There was thus obtained a solution of 2-chloro-2-ethoxyoxalyl-11β,21-dihydroxy-4,17(20)-[cis]-pregnadien-3-one 21-acetate.

2-CHLORO-11β,21-DIHYDROXY-4,17(20)-[CIS]-PREGNADIEN-3-ONE

To the solution of 2-chloro-2-ethoxyoxalyl-11β,21-dihydroxy - 4,17(20) - [cis]-pregnadien-3-one 21-acetate thus obtained was added 1 ml. of methanol containing 246 mg. of sodium methoxide and stirring was continued for 15 minutes. The mixture was then poured into 700 ml. of a mixture of ice and water and the resulting precipitate separated by filtration, washed with water and dried. There was obtained 7.36 g. of solid consisting essentially of 2-chloro-11β,21-dihydroxy-4,17(20)-[cis]-pregnadien-3-one which was dissolved in 150 ml. of methylene chloride and chromatographed through a 250 g. column of magnesium silicate (Florisil). The column was developed with 3 l. of hexanes (Skellysolve B) plus 7 percent acetone, 1.5 l. of hexanes plus 10 percent acetone and 2.5 l. of hexanes plus 20 percent acetone. The latter solvent mixture eluted 4.30 g. of 2-chloro-11β,21-dihydroxy-4, 17(20)-[cis]-pregnadien-3-one. The 21-acetate of this compound, prepared in the usual manner by reaction with acetic anhydride in pyridine, melts at 169.5 to $171°$ C. when recrystallized twice from hexanes containing a small amount of ethyl acetate.

2 - chloro-11β,21-dihydroxy-4,17(20)-[cis]-pregnadien-3-one 21-acetate is converted with osmium tetroxide and hydrogen peroxide (U.S. 2,769,825) or an amine oxide peroxide (2,769,823) to 2-chloro-11β,17α,21-trihydroxy-4-pregnene-3,20-dione 21-acetate, which compound possesses anti-inflammatory and glucocorticoid activity.

EXAMPLE 2

*2-chloro-6α-methyl-11β,21-dihydroxy-4,17(20)-[cis]-pregnadien-3-one*

Following the procedure of Example 1 exactly, but substituting as starting steroid 6α-methyl-11β,21-dihydroxy-4,17(20)-[cis]-pregnadien-3-one 21-acetate [Spero et al., J. Am. Chem. Soc., 78, 6213 (1956)], there was thus produced 2-chloro-6α-methyl-11β,21-dihydroxy-4, 17(21)-[cis]-pregnadien-3-one which, when crystallized from ethyl acetate, was obtained as prisms melting at 167–169° C. (dec).

Calculated for $C_{22}H_{31}ClO_3$: C, 69.73; H, 8.25; Cl, 9.36. Found: C, 69.64; H, 8.32; Cl, 9.58.

The acetate of this compound, prepared with acetic anhydride in pyridine, is converted with osmium tetroxide and hydrogen peroxide or an amine oxide peroxide according to the method described in Example 1 to 2-chloro-6α - methyl-11β,17α,21-trihydroxy-4-pregnene-3,20-dione 21-acetate, which compound possesses outstanding anti-inflammatory and glucocorticoid activity.

EXAMPLE 3

*2-chloro-9α-fluoro-11β,21-dihydroxy-4,17(20)-[cis]-pregnadien-3-one*

Following the procedure of Example 1 exactly, but substituting as starting steroid 9α-fluoro-11β,21-dihydroxy-4,17(20)-[cis]-pregnadien-3-one 21-acetate (application of Lincoln and Hogg, S.N. 476,061) there was thus produced 2-chloro-9α-fluoro-11β,21-dihydroxy-4, 17(20)-[cis]-pregnadien-3-one.

Similarly, the following compounds are converted to the corresponding 2-chloro compounds: 4,17(20)-pregnadien - 3-one, 11β-hydroxy-4,17(20)-pregnadien-3-one, 11β,21 - dihydroxy-4,17(20)-[cis]-pregnadien-3-one, 21-hydroxy - 4,17(20) - [cis]-pregnadien-3,11-dione, 21-hydroxy-4,17(20)-[trans]-pregnadien-3-one and 11β,21-dihydroxy-16α-methyl-4,17(20)-pregnadien-3-one 21-acetate.

The 21-acyl esters of all of the above compounds are converted with osmium tetroxide and N-methylmorpholine oxide peroxide in the manner described in Example 1 to the corresponding 17α-hydroxy-20-keto compounds, which compounds possess pharmacological, e.g., anti-inflammatory, activity.

EXAMPLE 4

*2-chloro-9(11)-dehydro-testosterone acetate*

Following the procedure of Example 1 exactly, but substituting as starting steroid 9(11)-dehydro-testosterone acetate there was thus produced 2-chloro-9(11)-dehydro-testosterone acetate, an active androgen.

Similarly, 4,9(11)-androstadien-3,17-dione was converted to 2 - chloro - 4,9(11)-androstadiene-3,17-dione, 9(11)-dehydro-17α-methyltestosterone to 2-chloro-9(11)- dehydro-17α-methyltestosterone and 17-ethinyltestosterone to 2-chloro-17-ethinyltestosterone, which compounds possess anabolic, androgenic, progestational and estrogenic activity.

EXAMPLE 5

*2-bromostigmastadienone*

Following the procedure of Example 1, but substituting as starting steroid 4,22-stigmastadien-3-one and substituting a molar equivalent of N-bromoacetamide for the 1,3-dichloro-5,5-dimethylhydantoin, there was thus produced 2-bromostigmastadienone. This compound is dehydrohalogenated to 1,4,22-stigmastatrienone which is converted by ozonization, mild enolacetylation followed by chromic acid oxidation to the known 1-dehydroprogesterone.

Similarly, the following compounds are converted to the corresponding 2-bromo compounds: 4,16(17)-androstadien-3-one, Δ$^{4,6,22}$-ergostatrien-3-one, Δ$^{4,7,22}$-ergostatrien-3-one, brassicastenone, fucostenone, 24,24-diphenyl-4,23-choladien-3-one, 24,24-diphenyl-4,20(22),23-cholatrien-3-one, 9(11)-dehydroprogesterone, 11-dehydroprogesterone, 14-anhydrocorticosterone acetate, 17α-vinyltestosterone, 17α-allyltestosterone, 3-keto-4,9(11)-bisnorcholadienic acid methyl ester, 11-dehydrocorticosterone 21-acetate and 4,20(22)-norcholadien-3-one.

I claim:

1. The process which comprises the steps of (1) condensing a steroid represented by the formula:

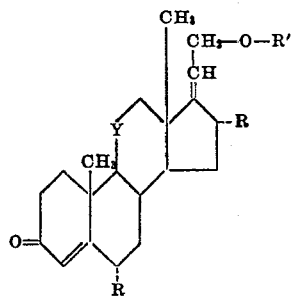

wherein R is selected from the group consisting of hydrogen and methyl, at least one R being hydrogen, R' is selected from a group consisting of hydrogen and the acyl radical of a hydrocarbon carboxylic acid and Y is selected from the group consisting of methylene, hydroxymethylene and carbonyl, with a lower-alkyl diester of oxalic acid in the presence of an alkali-metal lower-alkoxide to produce the alkali-metal enolate of a 2-lower-alkoxyoxalyl compound otherwise corresponding to the above-formula; halogenating the thus-produced compound with a N-chloroimide to produce a 2-lower-alkoxyoxalyl-2-chloro compound otherwise corresponding to the above-formula; and removing the 2-carbonyl group with an alkali-metal lower-alkoxide in the presence of a lower-alkanol to produce a 2-chloro compound otherwise corresponding to the above formula.

2. A process for the halogenation of a 2-monocarbonyl substituted Δ$^4$-3-keto pregnane starting compound containing a 17(20) double bond without concomitant halogenation of said 17(20) double bond, the 2-carbonyl substituent selected from the group consisting of formyl, lower-alkoxyoxalyl and trichloroacetyl, which comprises reacting said starting compound with a halogenation compound selected from the group consisting of an N-haloamide and an N-haloimide, wherein the halogen has an atomic weight from 35 to 127, inclusive, under essentially anhydrous, non-acidic conditions to produce the 2-halo 2-carbonyl substituent compound corresponding otherwise to the starting compound.

3. The process of claim 2 wherein the halogenating agent is an N-haloimide wherein the halogen has an atomic weight from 35 to 80, inclusive.

4. The process of claim 2 wherein the halogenating agent is an N-haloamide wherein the halogen has an atomic weight from 35 to 80, inclusive.

5. The process of claim 2 wherein the starting steroid has an 11-position substituent selected from the group consisting of hydrogen, hydroxy, and ketonic oxygen and a 21-position substituent selected from the group consisting of hydrogen, hydroxy, and acyloxy wherein the acyl radical is that of a hydrocarbon carboxylic acid containing from one to twelve carbon atoms, inclusive.

6. The process of claim 2 wherein the starting steriod is 11β,21-dihydroxy-4,17(20)-pregnadien-3-one.

7. The process of claim 2 wherein the starting steroid is 6α-methyl-11β,21-dihydroxy-4,17(20)-pregnadien-3-one.

8. The process of claim 2 wherein the halogenating compound is 1,3-dichloro-5,5-dimethylhydantoin.

9. The process which comprises the step of halogenating an alkali-metal enolate of a steroid represented by the formula:

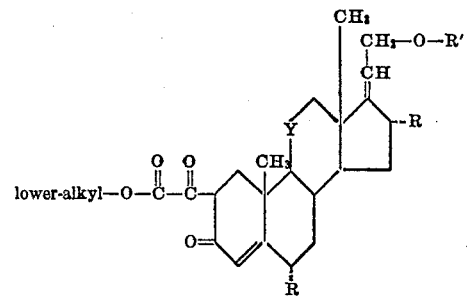

wherein R is selected from the group consisting of hydrogen and methyl, at least one R being hydrogen, R' is selected from the group consisting of hydrogen and the acyl radical of a hydrocarbon carboxylic acid and Y is selected from the group consiting of methylene, hydroxymethylene and carbonyl, with an N-haloimide wherein the halogen has an atomic weight from 35 to 80, inclusive, under essentially anhydrous, non-acidic conditions to produce the corresponding 2-halogenated compound.

10. The process which comprises the step of halogenating an alkali-metal enolate of a steroid represented by the formula:

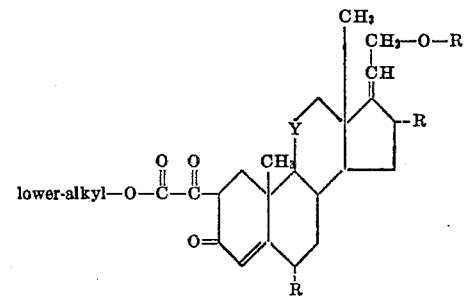

wherein R is selected from the group consisting of hydrogen and methyl, at least one R being hydrogen, R' is selected from the group consisting of hydrogen and the acyl radical of a hydrocarbon carboxylic acid and Y is selected from the group consisting of methylene, hydroxymethylene and carbonyl, with an N-haloamide wherein the halogen has an atomic weight from 35 to 80, inclusive, under essentially anhydrous, non-acidic conditions to produce the corresponding 2-halogenated compound.

11. A process for the halogenation of a 2-monocarbonyl substituted Δ$^4$-3-keto pregnane starting compound containing a 17(20) double bond without concomitant halogenation of said 17(20)-double bond, the 2-carbonyl substituent selected from the group consisting of formyl, lower-alkoxyoxalyl and trichloroacetyl, which comprises reacting said starting compound with a halogenation compound selected from the group consisting of an N-haloamide and an N-haloimide, wherein the halogen has an atomic weight from 35 to 127, inclusive, under essentially anhydrous, non-acidic conditions to produce the 2-halo 2-carbonyl substituent compound corresponding otherwise to the starting compound, removing the 2-carbonyl substituent with an alkali-metal base in the presence of a compound selected from the group consisting of water and a lower-alkanol, to produce a 2-halo $\Delta^4$-3-keto pregnane steroid compound containing a 17(20) double bond.

References Cited in the file of this patent

UNITED STATES PATENTS

| | | |
|---|---|---|
| 2,705,237 | Djerassi et al. | Mar. 29, 1955 |
| 2,790,814 | Hogg et al. | Apr. 30, 1957 |
| 2,811,521 | Chemerda | Oct. 29, 1957 |
| 2,837,517 | Herr et al. | June 3, 1958 |